United States Patent [19]
Caldera et al.

[11] Patent Number: 5,359,682
[45] Date of Patent: * Oct. 25, 1994

[54] METHOD OF ADJUSTING THE OPERATION CHARACTERISTICS OF INTEGRATED OPTICAL DEVICES

[75] Inventors: Claudio Caldera, Saluzzo; Carlo De Bernardi, Turin; Salvatore Morasca, Como, all of Italy

[73] Assignee: CSELT-Centro Studi E Laboratori Telecomunicazioni S.p.A., Turin, Italy

[*] Notice: The portion of the term of this patent subsequent to Aug. 18, 2009 has been disclaimed.

[21] Appl. No.: 931,290

[22] Filed: Aug. 17, 1992

Related U.S. Application Data

[63] Continuation-in-part of Ser. No. 658,217, Feb. 20, 1991, Pat. No. 5,139,556.

[30] Foreign Application Priority Data

Mar. 7, 1990 [IT] Italy ............................ 67157 A/90

[51] Int. Cl.$^5$ .................................................. G02B 6/10
[52] U.S. Cl. .................................. 385/14; 65/29.12; 427/162
[58] Field of Search .................. 385/14, 28; 65/3.1, 65/3.11, 3.12, 18.1, 29, 60.1, 60.2, 60.5; 427/162, 165, 167; 372/45

[56] References Cited

U.S. PATENT DOCUMENTS

| 3,806,223 | 4/1974 | Keck et al. | 117/23 |
| 3,873,339 | 3/1975 | Hudson | 117/23 |
| 4,775,208 | 10/1988 | Robinson et al. | 385/28 |
| 4,859,013 | 8/1989 | Schmitt et al. | 385/28 |
| 5,139,556 | 8/1992 | Caldera et al. | 385/28 X |
| 5,208,827 | 5/1993 | Sagawa et al. | 385/14 |
| 5,293,436 | 3/1994 | Diemeer | 385/14 X |

FOREIGN PATENT DOCUMENTS 60-256101 12/1985 Japan.
63-206709 8/1988 Japan.

OTHER PUBLICATIONS

Seki et al., "Two-step Purely Thermal Ion-Exchange Technique", Electronic Letters, vol. 24, pp. 1258–1259, 1988.
Alferness, "Waveguide Electrooptic Modulator", IEEE Transaction on Microwave Theory, vol. MTT-30, No. 8, Aug. 1988, pp. 1258–1259.

*Primary Examiner*—Rodney B. Bovernick
*Assistant Examiner*—Hemang Sanghavi
*Attorney, Agent, or Firm*—Herbert Dubno

[57] ABSTRACT

A method of adjusting the operation of optical networks in terms of propagation constants of guided modes in integrated optical devices, allowing a considerable number of out of tolerance devices to be recovered by depositing on the surface where the optical guides are manufactured, once the normal fabrication process is completed, a further layer of transparent material of suitable size and refractive index.

11 Claims, 2 Drawing Sheets

METHOD OF ADJUSTING THE OPERATION CHARACTERISTICS OF INTEGRATED OPTICAL DEVICES

CROSS REFERENCE TO RELATED APPLICATION

This is a continuation-in-part of our copending application Ser. No. 07/658,217 filed Feb. 20, 1991, now U.S. Pat. No. 5,139,556, issued Aug. 18, 1992.

FIELD OF THE INVENTION

The present invention relates to a method of manufacturing integrated optical devices and, more particularly, to a method of adjusting operation characteristics of such devices.

BACKGROUND OF THE INVENTION

The fabrication of integrated optical devices demands very accurate technological methods to cope with very restrictive tolerances in the chemical, physical and geometric characteristics of the manufactured devices. In fact even small errors can cause considerable variations in the required optical characteristics, e.g. a different spectral interval of operation, different splitting ratios in beam splitters or in directional couplers, and the like. These disadvantages can derive not only from inaccuracies in successive steps of the technological process of fabrication, but also from errors or insufficiencies of the design techniques, especially when all the boundary conditions and their possible variations were not taken into account.

Since the guiding structures forming the integrated optical devices are expensive and difficult to produce (e.g. in case of semiconductor materials, from special crystals, and the like) manufacturing rejects highly affect the final cost. Hence it can be convenient to adjust the optical characteristics of the obtained device to return its performance to the required specifications.

If the device is made of electrical-field-sensitive material, e.g. of lithium niobate (LiNbO$_3$), or of certain semiconductor materials, its optical characteristic modification can be obtained by using the method described in the paper entitled "Waveguide Electrooptic Modulators" by Rod C. Alferness, page 1121 of IEEE Transactions on Microwave Theory and Techniques, August 1982.

According to this method suitable electrodes are placed on the device for applying a potential difference of convenient value. The potential difference generates an electrical field permitting a change in the optical characteristics of the device in its operation phase. The method requires further steps in the process of fabrication to manufacture the electrodes and, once the device is fabricated, it requires permanent application of a voltage of controlled value, even through the operation conditions are always the same.

OBJECT OF THE INVENTION

The invention has as its object the elimination of these disadvantages by a method of adjusting the operation characteristics of integrated optical devices which allows a considerable number of devices initially out of tolerance to be recovered, using a few additional technological steps besides those necessary for the fabrication, does not require the application of electrical fields for obtaining the desired operation optical characteristics, and demands only the setup of the deposition conditions of a transparent material.

SUMMARY OF THE INVENTION

The present invention provides a method of adjusting the operation characteristics of integrated optical devices, formed by a network of optical guides manufactured on the surface of a substrate wherein light radiations are processed, which consists of depositing on the surface wherein the optical guides are manufactured, once the normal fabrication process of the device is completed, a further layer of transparent material.

BRIEF DESCRIPTION OF THE DRAWING

The foregoing and other characteristics of the present invention will be made clearer by the following description of a preferred embodiment thereof given by way of non-limiting example, with reference to the accompanying drawing, wherein.

SPECIFIC DESCRIPTION

As an example of application of the method provided by the invention a 3 dB beam splitter is considered; it operates on the basis of the bimodal interference principle. The incoming optical signal is to be exactly divided in half between the two output branches. If the obtained device does not perform exactly with the partitioning required, it is possible to intervene with the present correction method and make the changes necessary to meet the required operation specifications.

Figure 1:
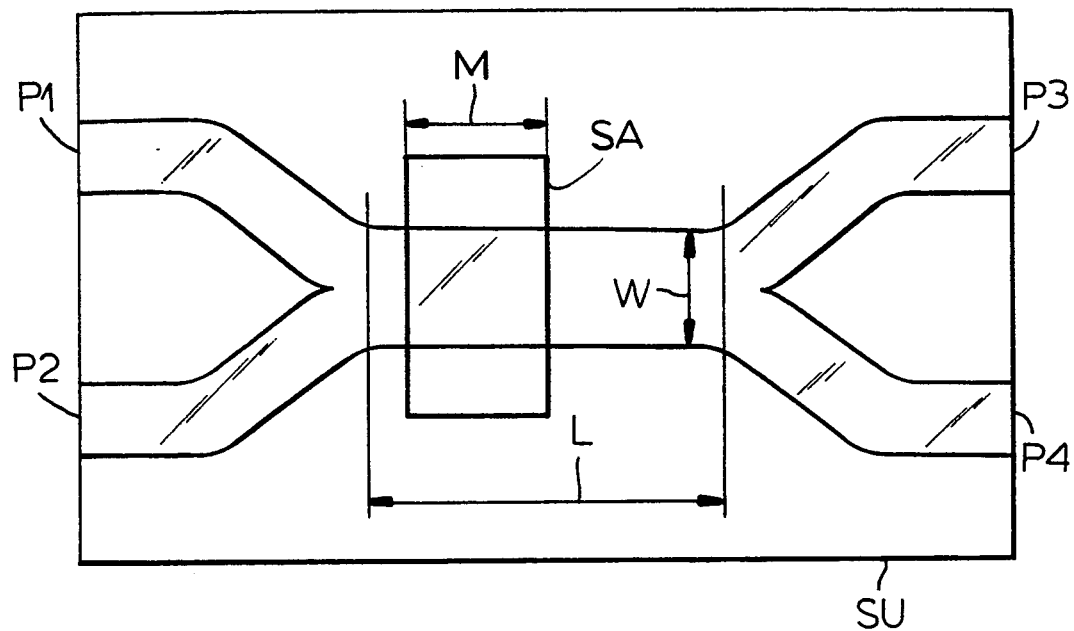
FIG. 1 is a plan of a beam splitter.

The splitter shown in FIG. 1 consists of two input single-mode guides, with input gates P1 and P2, which join through a Y-connection into a segment of bimodal guide of length L and width W. At the end of the bimodal guide segment there is a Y beam splitter entering two output single-mode guides, with output gates P3 and P4.

This kind of device can operate equally well by exchanging the input gates with the output gates. Besides, either a single signal to be split exactly into two parts or two signals can be sent to the inputs, one per each input gate, when one wishes to combine them with one another and extract at the output a combination signal. The latter method can be used in a coherent receiver, when the locally-generated signal is to be combined with the signal received to effect its detection.

Optical waveguides forming the device can be manufactured by epitaxial growth of a ternary or quaternary semiconductor material, such as InAlAs, InGaAlAs or InGaAsP, on a substrate of InP:Fe, denoted by SU in FIG. 1. Afterwards the required guiding network is obtained by masking the grown substrate and by chemical etching the uncovered parts.

The beam splitter operation is as follows. The optical signal is sent to an input gate, e.g. P1, and covers the single-mode guide segment. When it arrives at the bimodal guide segment, through Y-junction, both the fundamental and the first higher mode are excited, which interfere with each other. As an effect of the interference, a periodical spatial oscillation of the light intensity occurs, with a sequence of maxima and minima along the length L of the bimodal guide.

The period of this oscillation depends on the difference between the effective refractive indices of the two modes, which depends in turn on the guide geometric characteristics, width and length, as well as on the refractive indices of the various materials forming the whole guiding structure. More particularly, the period of oscillation depends on the refractive index of the substrate, of the guiding layer and of the material which possibly covers the latter layer.

If the oscillation phase assumes a convenient value at the output end of the bimodal segment, in the subsequent Y-splitter and in the two single-mode output guides, one exactly obtains half the power available in the input guide, possible losses excepted. The oscillation phase at the Y-splitter of course depends on length L of the bimodal segment, which hence is to be manufactured with rather stringent tolerances.

The greater errors which can occur in the fabrication of such a device, due to limited accuracy obtainable in the different steps of the technological process, are encountered in the values of width and thickness of the guides, as well as on the chemical composition of the grown material. The tolerances obtained do not ensure that the phase of the oscillation of the light intensity at the output end of the bimodal guide segment is the optimum to supply the desired beam splitting.

According to the invention, the technological process inaccuracy can be overcome by depositing on the surface, whereupon the optical guides are manufactured, once the normal fabrication process has been completed, a further transparent material layer. This covering layer, which is transparent not to increase the guide losses, is homogeneous, has a convenient refractive index and any selected thickness, provided the thickness is greater than a certain minimum value, generally of the order of some wavelengths of the processed radiation. This operation causes changes in the propagation constants of guided modes which depend on the values of the refractive indices of all the materials forming the waveguide structure and, more particularly, on the refractive indices of the substrate, of the guiding layer proper and of all the possible upper and lateral boundary layers. Hence by changing the refractive index of a covering layer and keeping unchanged the refractive index of all the other layers, one can change within a significant and useful interval the effective refractive indices in the bimodal guide and hence the period of the oscillation caused by the interference.

While fabricating the device, in case one realizes that the optical features of the finished item (or of a test sample taken from a set of identical samples) do not meet the required characteristics, an adjustment can be carried out by depositing a covering layer with a value of the refractive index capable of bringing the guiding structure to the operation point. The materials used generally should provide a refractive index lower than that of the optical guide to be adjusted and can consist of resins, polymers, organic or inorganic materials, which can be deposited by any desired method. For example, in case of splitting error with an output power of 33% on a branch and 67% on the other, it is necessary to deposit a layer of material with refractive index equal to 2 and thickness greater than 0.2 $\mu$m on a guide 200 $\mu$m long of InGaAlAs. Analogously, in case of splitting error with an output power of 44% on a branch and 56% on the other, it is necessary to deposit a layer of material with refractive index equal to 1.5 and thickness greater than 0.2 $\mu$m on a guide with the same characteristics.

The correction of a certain partitioning error can be performed not only by covering the whole optical guide with a layer of material with a suitable refractive index in function of the correction entity, but also by varying the length of the bimodal guide segment covered. In this way, the setup of different deposition conditions and techniques, which depend on the material used for the correction, can be avoided.

Whence, by varying the length M of the bimodal guide segment covered by this partial layer, denoted by SA in FIG. 1, it is possible to change the phase of the intensity oscillation of the light signal at the end of the bimodal guide and, as a consequence, the splitting ratio at the device output gates P3 and P4. The variation obtained increases with the value of the refractive index of the deposited material.

Figure 2:
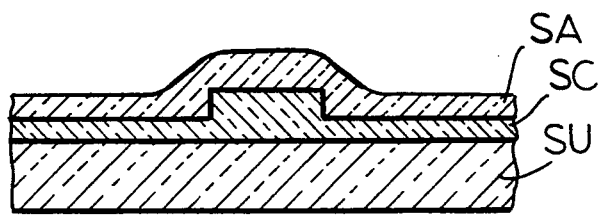
FIG. 2 is a sectional view of the beam splitter.

FIG. 2 shows a cross section of an intermediate zone of the device, from whence it is seen that the device is a simple sequence of layers forming the guiding structure. The substrate SU, the bimodal guide and correction layer SA.

By covering for a length equal to 100 $\mu$m the bimodal guide, which is 200 $\mu$m long, with a material having a refractive index equal to 1.5, a power splitting error of 47% on one branch and 53% on the other can be corrected.

The method above can be used to adjust the optical characteristics of other devices, e.g. directional couplers of DFB lasers (Distributed Feedback Bragg), fabricated with the above-mentioned materials or with other materials used in the integrated optics domain, such as glass, LiNbO$_3$, SiO$_2$, polymers, and the like.

Figure 3:
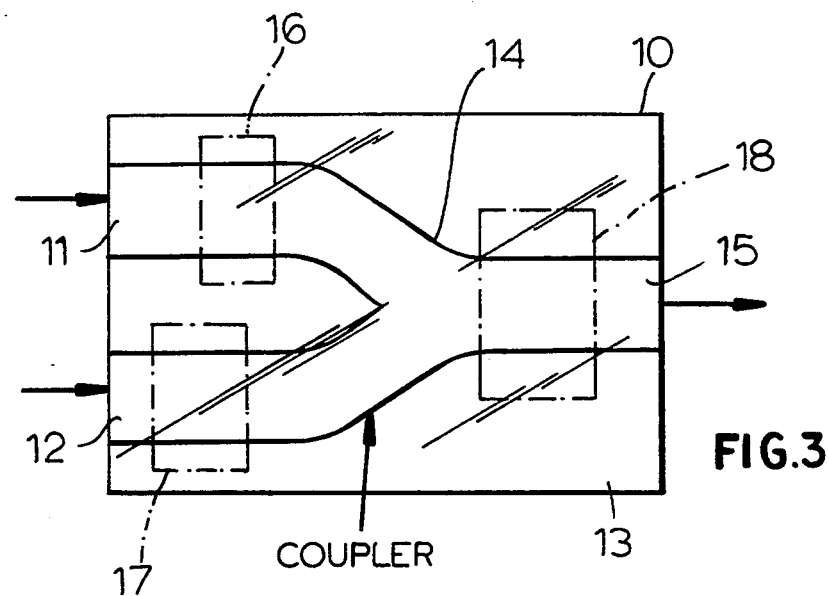
FIG. 3 is a view similar to FIG. 1 of a coupler according to the invention.

In FIG. 3, for example, we show a coupler 10 which can have branches 11 and 12 fabricated in accordance with the aforedescribed principles of integrated optics on a substrate 13 and connected by a Y 14 to the outgoing branch 15.

In this case, correction layers of various widths can be provided for the two branches 11 and 12 at 16 and 17, respectively, and a further correction can be provided by a layer 18 applied to the outgoing branch 15. The propagation constants through these various branches are thereby corrected or the optical characteristics are corrected. In this case the correction need not apply to bimodal systems as in FIGS. 1 and 2.

Figure 4:
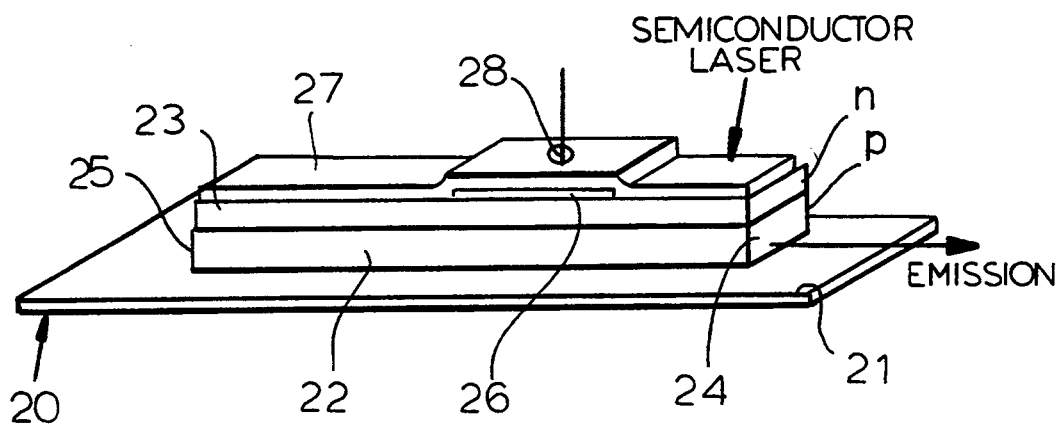
FIG. 4 is a diagrammatic perspective view of a semiconductive laser manufactured in accordance with the method of this invention.

The method can also be used to correct the emission wavelength of a semiconductor laser, e.g. as shown in FIG. 4. The laser 20 can comprise a gold foil or other terminal 21 on which a p-type layer 22 is applied followed by an n-type layer 23 forming the emission laser with its cleaved ends 24 and 25 and toughened longitudinal sides which are not separately designated. To correct the emission wavelength, after the n/p integrated optical unit is formed, a correction layer 26 may be applied over a portion of the length of the laser with the final metallic layer being applied subsequently at 27 and provided with the contact or terminal 28.

Figure 5:
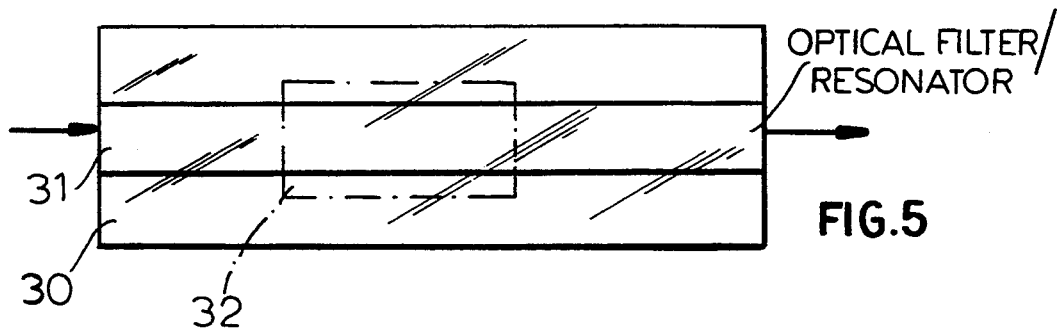
FIG. 5 is a view similar to FIG. 3 of an optical filter or resonator corrected utilizing the principles of this invention.

FIG. 5 shows the correction of the resonance frequency of an optical resonator or filter 31 formed on the substrate 30 in the form of an applied layer 32 along a portion of the length of the optical path of this optical resonator or filter.

We claim:

1. A method of making an integrated optical device, comprising the steps of:
    (a) forming on a surface of a substrate a network of optical guides by a manufacturing process resulting in a deviation from a predetermined periodical spatial oscillation of light intensity and from predetermined propagation constants of guided modes of light traversing said optical guides, thereby rendering said optical guides ineffective for said guided modes; and
    (b) upon completion of said manufacturing process and independently thereof, depositing upon said network and that portion of said surface not beneath said network a covering layer of transparent material, having a refractive index, to a thickness and over an extent to change the periodical spatial oscillation of light intensity and the propagation constants of said guided modes in said optical guides, thereby correcting said optical device and rendering said guides effective for said guided modes.

2. The method of claim 1 wherein the refractive index of said layer is selected in accordance with said deviation and in accordance with a correction required for said propagation constants.

3. The method of claim 1 wherein said layer is applied to said surface over an area selected in accordance with said deviation and in accordance with a correction required for said propagation constants.

4. An integrated optical device made by the method of claim 1.

5. The integrated optical device defined in claim 4 which comprises a substrate, a pair of said optical guides on said substrate forming input branches, one of said optical guides on said substrate forming an output branch, and a Y-shaped optical guide on said substrate connecting said input branches to said output branch in the form of a directional coupler.

6. The integrated optical device defined in claim 4 in the form of a semiconductive laser which comprises a terminal, a p-type layer on said terminal forming an optical guide, an n-type layer on said p-type layer, and a further terminal on said n-type layer.

7. The integrated optical device defined in claim 4 in the form of an optical resonator comprising a substrate, an optical path formed in a layer on said substrate, and a resonator formed along said optical path.

8. The integrated optical device defined in claim 4 in the form of an optical filter comprising a substrate, an optical path formed in a layer on said substrate, and a filter formed along said optical path.

9. In a method of making an integrated optical device in which a network of optical guides is formed on a surface of a substrate by a manufacturing process resulting in a deviation from a predetermined periodical spatial oscillation of light intensity and from predetermined propagation constants of guided modes of light traversing said optical guides, thereby rendering said optical guides ineffective for said guided modes, the improvement comprising:
    upon completion of said manufacturing process and independently thereof, depositing upon said network and that portion of said surface not beneath said network a covering layer of transparent material, having a refractive index, to a thickness and over an extent to change the periodical spatial oscillation of light intensity and the propagation constants of said guided modes in said optical guides, thereby correcting said optical device and rendering said guides effective for said guided modes.

10. The method of claim 9 wherein the refractive index of said layer is selected in accordance with said deviation and in accordance with a correction required for said propagation constants.

11. The method of claim 9 wherein said layer is applied to said surface over an area selected in accordance with said deviation and in accordance with a corrective required for said propagation constants.

* * * * *